(12) United States Patent
De Waal

(10) Patent No.: US 6,183,712 B1
(45) Date of Patent: Feb. 6, 2001

(54) PRODUCTION OF DICALCIUM PHOSPHATE OR MONOCALCIUM PHOSPHATE FROM CALCIUM PHOSPHATE

(76) Inventor: Jan C. De Waal, 131 Miller Street, Gordons Bay 7150 (ZA)

(*) Notice: Under 35 U.S.C. 154(b), the term of this patent shall be extended for 0 days.

(21) Appl. No.: 09/383,083

(22) Filed: Aug. 25, 1999

Related U.S. Application Data

(60) Provisional application No. 60/098,026, filed on Aug. 25, 1998.

(51) Int. Cl.$^7$ ............... C01B 15/16; C01B 25/36; C22B 26/00
(52) U.S. Cl. ............ 423/308; 423/157.2; 423/157.3; 423/157.4; 423/311; 423/312
(58) Field of Search ................ 423/308, 311, 423/312, 157.2, 157.3, 157.4

(56) References Cited

U.S. PATENT DOCUMENTS

| | | | |
|---|---|---|---|
| 852,372 | * 4/1907 | Bergmann | 423/308 |
| 1,788,952 | * 1/1931 | Holz | 423/308 |
| 2,728,635 | 12/1955 | Miller . | |
| 3,391,993 | 7/1968 | Cutter . | |
| 4,012,491 | 3/1977 | Hauge . | |

OTHER PUBLICATIONS

Derwent Publications Ltd., London, G.B.; AN 94–208026, XP002102469 & SU 1 810 319 A (Caspian Area Ore Metall Prodn Assoc), Apr. 23, 1993.

Ullmann's Encyclopedia of Industrial Chemistry, Fifth Edition, vol. A19, pp. 498–499 XP002102468.

* cited by examiner

Primary Examiner—Steven P. Griffin
Assistant Examiner—Maribel Medina
(74) Attorney, Agent, or Firm—Bennett Jones LLP

(57) ABSTRACT

A method of producing dicalcium phosphate from calcium phosphate includes reacting the calcium phosphate with a mineral acid such as sulphuric acid to produce a calcium salt and phosphoric acid. The calcium salt may then be hydrolyzed to form a calcium alkali which may then be reacted with the phosphoric acid to produce dicalcium phosphate. Also, a method of producing monocalcium phosphate from calcium phosphate includes reacting the calcium phosphate with sulphuric acid to produce monocalcium phosphate. The monocalcium phosphate may be further processed to remove fluorine contamination and to produce fluorine-free dicalcium phosphate or dicalcium phosphate dihydrate.

9 Claims, 3 Drawing Sheets

PRODUCTION OF DICALCIUM PHOSPHATE OR MONOCALCIUM PHOSPHATE FROM CALCIUM PHOSPHATE

CROSS-REFERENCE TO RELATED APPLICATIONS

This application claims the priority benefit of U.S. Provisional Application No. 60/098,026 filed on Aug. 25, 1998, which application is incorporated herein by reference in its entirety.

FIELD OF THE INVENTION

The present invention relates to methods for the manufacture of calcium hydrogenphospate from calcium phospate. It also relates to methods for the manufacture of monocalcium phosphate fertilizer, edible monocalcium phosphate and edible dicalcium phosphates.

BACKGROUND OF THE INVENTION

Tricalcium orthophosphate, $Ca_3(PO_4)_2$, commonly known as calcium phosphate, occurs in nature as rock phosphate ore, for example and is used as such as a source of fertilizer. It can also be converted with sulphuric acid to a mixture of calcium sulphate and phosphoric acid, or it can also be converted with sulphuric acid to a mixture of calcium sulfate and monocalcium phosphate, $Ca(H_2PO_4)_2$, the latter also being known as calcium dihydrogen phosphate. Calcium phosphate has a relatively low phosphorous content (20% m/m) while monocalcium phosphate, while having a much higher phosphorous content (26.5% m/m), is difficult to manufacture, and also expensive mainly because one of the by-products of the reaction by means of which it is so prepared, calcium sulphate, has to be discarded as a waste product.

Dicalcium phosphate, $CaHPO_4$, also known as calcium hydrogenphosphate, has a relatively high phophorous content (22.8% m:m) and may be used as a fertilizer. It is also used in animal licks as well as in the manufacture of certain toothpastes.

Therefore, there is a need in the art for an economical method of producing calcium hydrogenphosphate from calcium phosphate. There is a further need in the art for an economical method of producing monocalcium phosphate fertilizer from calcium phosphate and further producing edible products from the resultant fertilizer.

SUMMARY OF THE INVENTION

In accordance with one aspect of the invention, a method of producing dicalcium phosphate from calcium phosphate comprises the following steps:
a) reacting the calcium phosphate with a suitable mineral acid to form the corresponding calcium salt and phosphoric acid;
b) hydrolyzing the calcium salt produced by step a) to form the corresponding calcium alkali and the mineral acid of step a), or its salt;
c) if the salt of the mineral acid is formed in step b), electrolyzing said salt to form the corresponding mineral acid together with an alkali;
d) recycling the mineral acid of steps b) or c) to step a);
e) reacting the calcium alkali of step b) with the phosphoric acid of step a) to form dicalcium phosphate.

In accordance with another aspect of the invention, the invention comprises a method of producing monocalcium phosphate ("MCP") fertilizer comprising the steps of:

(a) reacting ore containing calcium phosphate with sulfuric acid to produce MCP, calcium sulfate and water;
(b) reacting the MCP with oxalic acid to produce calcium oxalate and phosphoric acid;
(c) reacting additional ore containing calcium phosphate with the phosphoric acid produced in step (b) to produce MCP.

The monocalcium phosphate or MCP may be further processed in accordance with this second aspect of the invention to produce fluorine-free edible MCP, or fluorine-free dicalcium phosphate, or fluorine-free dicalcium phosphate dihydrate.

BRIEF DESCRIPTION OF THE DRAWINGS

The invention will now be described by way of exemplary embodiments with reference to the accompanying schematic drawings. In the drawings.

DETAILED DESCRIPTION OF THE INVENTION

The present invention provides for processes for the manufacture of dicalcium phospate from calcium phospate. It also relates to methods for the manufacture of monocalcium phosphate fertilizer, edible monocalcium phosphate and edible dicalcium phosphates.

When describing the present invention, the following terms have the following meanings, unless indicated otherwise. All terms not defined herein have their common art-recognized meanings.

A. Definitions

The term "calcium phosphate" refers to tricalcium orthophosphate having the formula $Ca_3(PO_4)_2$.

The term "dicalcium phosphate" or "DCP" refers to the compound having the formula $CaHPO_4$. This compound may also be referred to as calcium hydrogenphosphate.

The term "monocalcium phosphate" or "MCP" refers to the compound having the formula $Ca(H_2PO_4)_2$ This compound may also be referred to as calcium dihydrogenphosphate.

B. Description

Figure 1:
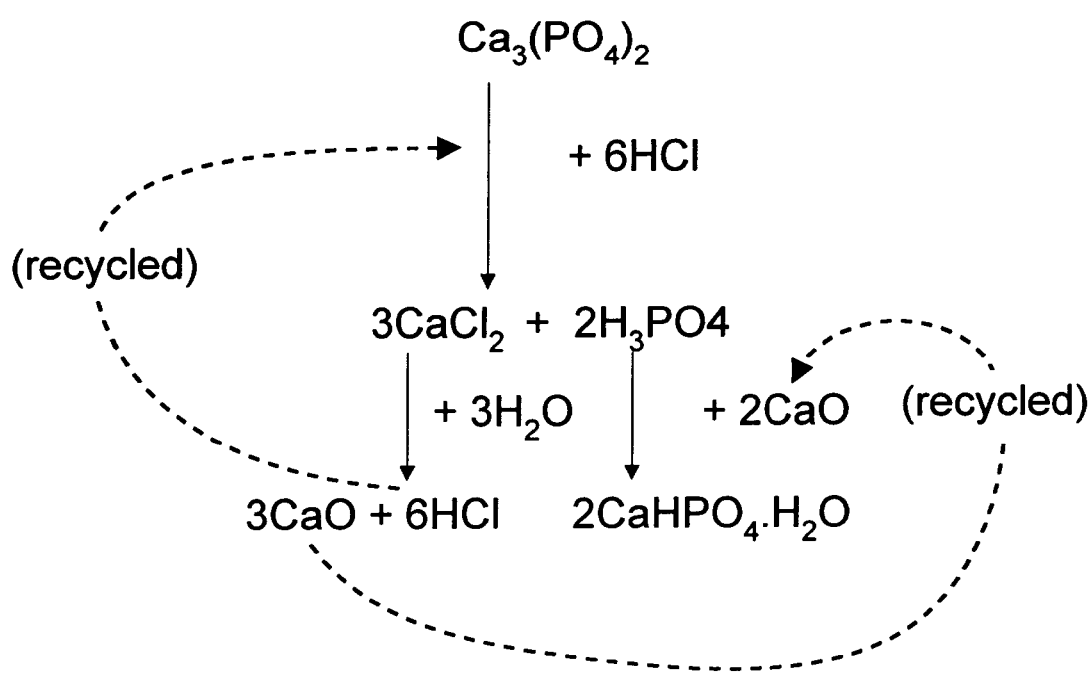
FIG. 1 is a flowchart of one embodiment of the first aspect of the invention.

Referring to FIG. 1, in one embodiment of the invention, the mineral acid comprises hydrochloric acid, so that calcium chloride is the calcium salt formed. The calcium chloride is then treated with water at an elevated temperature, preferably in the range of 1000 to 1200° C., to form calcium oxide and hydrochloric acid. Preferably, the aforesaid hydrolyzation of the calcium chloride is carried out in a suitable cyclone.

In the preferred embodiment, the calcium chloride/water solution is damped in and heated to its boiling point before it is introduced to the cyclone, with care being taken to ensure that the resulting evaporation does not exceed a value commensurate with the solubility of calcium chloride in water. This ensures that there is sufficient water, in fact a slight excess, to take the reaction to completion.

Figure 2:
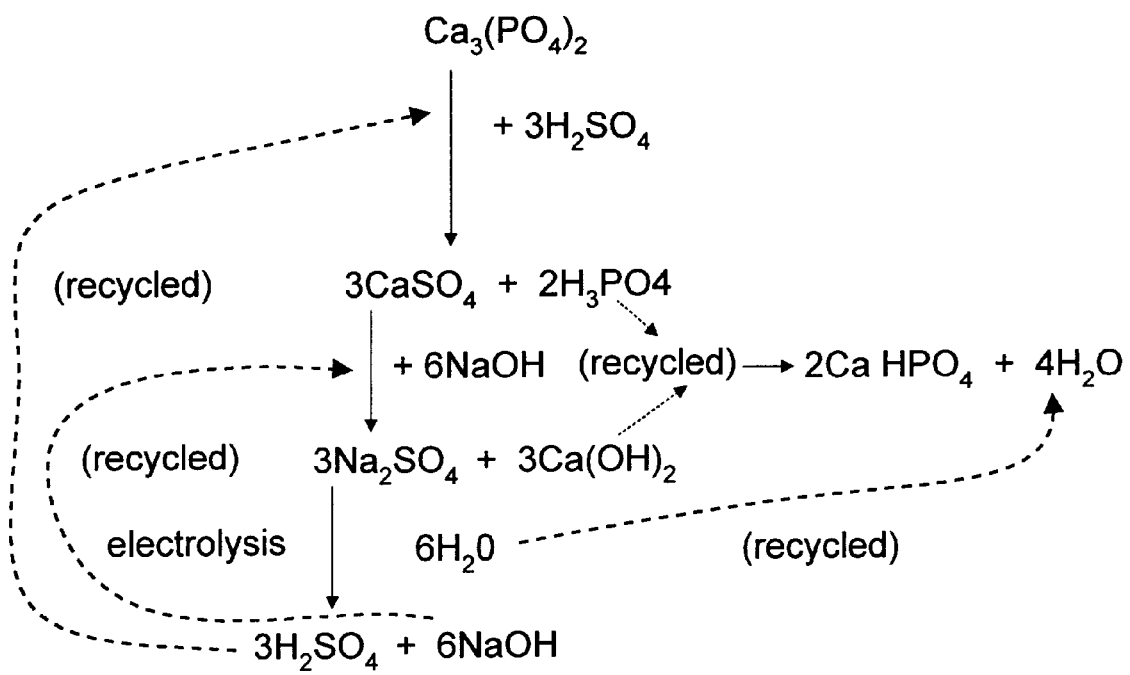
FIG. 2 is a flowchart of another embodiment of the first aspect of the invention.
Figure 3:
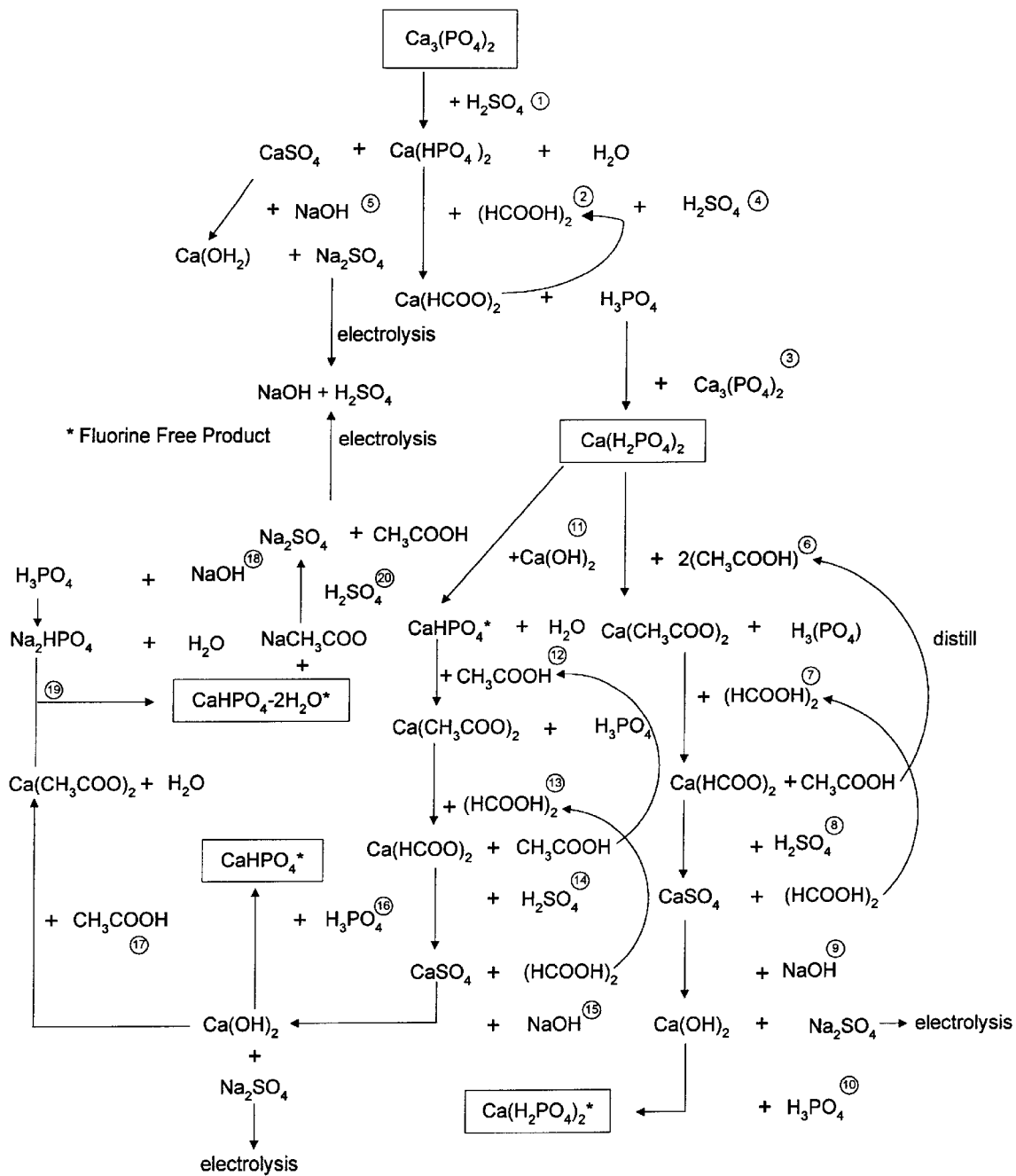
FIG. 3 is a flowchart of a preferred embodiment of the second aspect of the invention.

Referring to FIG. 2, in an alternative embodiment of the invention, the mineral acid used is sulphuric acid, so that calcium sulphate is the salt which is formed. In this embodiment, the hydrolysis of the calcium sulphate is carried out with an alkali metal hydroxide, such as sodium hydroxide, to form calcium hydroxide and the alkali metal sulphate. The latter is then electrolyzed to sulphuric acid together with the alkali metal hydroxide. The latter is then recycled for the aforementioned hydrolysis reaction.

The preferred source for the calcium phosphate starting material is calcium phosphate rock ore.

It may therefore be appreciated by a person skilled in the art that the overall reactants required for the method of the present invention are calcium phosphate and the hydrolysis reagent required in step b). The only other requirement is either the energy required for obtaining the elevated temperature for the hydrolysis step in the one instance, or the electrical energy required for the electrolysis step in the other instance.

FIGS. 1 and 2 represent the chemical reactions occuring in the aforesaid two instances. In either instance, the specific reactions are illustrative of the invention and are not intended to be limiting of the scope of the invention.

Apart from the calcium hydrogenphosphate, a small amount of excess calcium oxide is produced as a byproduct in the overall reaction in the one instance, and calcium hydroxide in the other instance, either of which can be used as a source for lime (CaO and Ca(OH)$_2$).

In another aspect of the invention, the invention comprises a method of producing MCP fertilizer from calcium phosphate ore. The method is based on the following reactions:

$$Ca_3(PO_4)_2 + H_2SO_4 \rightarrow Ca(H_2PO_4)_2 + CaSO_4 + H_2O \quad (1)$$

$$Ca(H_2PO_4)_2 + (HCOOH)_2 \rightarrow Ca(HCOO)_2 + H_3PO_4 \quad (2)$$

$$H_3PO_4 + Ca_3(PO_4)_2 \rightarrow Ca(H_2PO_4)_2 \quad (3)$$

In a preferred embodiment, the oxalic acid used in reaction (2) regenerated for reuse by the following reaction:

$$Ca(HCOO)_2 + H_2SO_4 \rightarrow CaSO_4 + (HCOOH)_2 \quad (4)$$

Also in the preferred embodiment, the calcium sulfate waste product from reaction (1) may be converted to a useful product by the following reaction:

$$CaSO_4 + 2NaOH \rightarrow Ca(OH)_2 + Na_2SO_4 \quad (5)$$

The calcium hydroxide produced may be used in the preparation of dicalcium phosphate ("DCP") and DCP dihydrate (CaHPO$_4$.2H$_2$O), as described herein. The sodium sulfate may be electrolyzed to regenerate sodium hydroxide and sulphuric acid.

The MCP fertilizer product of reactions (1) to (3) above is contaminated with calcium fluoride and is therefore inedible. If an edible MCP product is desired, the fluorine compounds may be separated from the MCP by the following reactions:

$$Ca(H_2PO_4)_2 + 2(CH_3COOH) \rightarrow Ca(CH_3COO)_2 + 2H_3PO_4 \quad (6)$$

$$Ca(CH_3COO)_2 + (HCOOH)_2 \rightarrow Ca(HCOO)_2 + 2(CH_3COOH) \quad (7)$$

$$Ca(HCOO)_2 + H_2SO_4 \rightarrow CaSO_4 + (HCOOH)_2 \quad (8)$$

$$CaSO_4 + 2NaOH \rightarrow Ca(OH)_2 + Na_2SO_4 \quad (9)$$

$$Ca(OH)_2 + 2H_3PO_4 \rightarrow Ca(H_2PO_4)_2 \text{ (fluorine free)} \quad (10)$$

In this process, the acetic acid used in reaction (6) dissolves the MCP without dissolving the contaminating fluorine compounds. Therefore, the fluorine may be separated by decanting or filtering the solution of calcium acetate and phosphoric acid. The use of oxalic acid in reaction (7) overcomes the buffering action of the calcium acetate.

In a preferred embodiment, the acetic acid regenerated in reaction (7) is distilled to reconcentrate the acetic acid for reuse in reaction (6). Also, the oxalic acid obtained in reaction (8) may be reused in reaction (7).

The MCP product of reaction (3) may further be processed to produce edible DCP in a process based on the following reactions:

$$Ca(H_2PO_4)_2 + Ca(OH)_2 \rightarrow 2CaHPO_4 + 2H_2O \quad (11)$$

$$CaHPO_4 + 2(CH_3COOH) \rightarrow Ca(CH_3COO)_2 + H_3PO_4 \quad (12)$$

$$Ca(CH_3COO)_2 + 2(HCOOH) \rightarrow Ca(HCOO)_2 + 2(CH_3COOH) + H_2O \quad (13)$$

$$Ca(HCOO)_2 + H_2SO_4 \rightarrow CaSO_4 + (HCOOH)_2 \quad (14)$$

$$CaSO_4 + 2NaOH \rightarrow Ca(OH)_2 + Na_2SO_4 \quad (15)$$

$$Ca(OH)_2 + H_3PO_4 \rightarrow CaHPO_4 \text{(fluorine free)} + H_2O \quad (16)$$

The MCP is converted to DCP by the addition of calcium hydroxide which is preferably obtained from reaction (5) above. The DCP is then dissolved with acetic acid, which does not dissolve calcium floride, which may then be separated by decantation or filtering. Again, the use of oxalic acid in reaction (13) overcomes the buffering action of the calcium acetate. Similarly, the acetic acid produced in reaction (13) may be reused in reaction (12) after distillation to reconcentrate the acetic acid. The oxalic acid produced in reaction (14) may also be reused in the process.

Alternatively, DCP.2H$_2$O may be produced in accordance with the following reactions. Instead of reacting calcium hydroxide produced in reaction (15) with phosphoric acid as in reaction (16), the calcium hydroxide is reacted with acetic acid and processed in accordance with the following reactions:

$$Ca(OH)_2 + 2(CH_3COOH) \rightarrow Ca(CH_3COO)_2 + H_2O \quad (17)$$

$$H_3PO_4 + 2NaOH \rightarrow Na_2HPO_4 + H_2O \quad (18)$$

$$Na_2HPO_4 + Ca(CH_3COO)_2 \cdot CaHPO_4 2H_2O + 2NaCH_3COO \quad (19)$$

Reaction (18) will generate a significant amount of heat as a result of the acid-base reaction. After the products have cooled, preferably to about 60° C., the sodium hydrogen phosphate may be reacted with the calcium acetate in accordance with reaction (19) above.

Preferably, acetic acid is regenerated from the sodium acetate and reused in the process by the following reaction:

$$2NaCH_3COO + H_2SO_4 \rightarrow Na_2SO_4 + 2(CH_3COOH) \quad (20)$$

The specific reactions disclosed above are intended to be illustrative of the invention and are not intended to be limiting of the scope of the invention in any manner.

As will be apparent to those skilled in the art, various modifications, adaptations and variations of the within specific disclosure can be made without departing from the teachings of the present invention.

The embodiments of the invention in which an exclusive property or privilege is claimed are defined as follows:

1. A method for the manufacture of dicalcium phosphate from calcium phosphate comprising:
   (a) reacting the calcium phosphate with a suitable mineral acid to form the corresponding calcium salt and phosphoric acid;

(b) hydrolyzing the calcium salt of step (a) to form the corresponding calcium alkali and the mineral acid of step (a) or its salt;

(c) where the salt of the mineral acid is formed in step (b), electrolyzing such salt to form the corresponding mineral acid together with an alkali;

(d) recycling the mineral acid of steps (b) or (c) to step (a); and (e) reacting the calcium alkali of step (b) with the phosphoric acid of step (a) to form dicalcium phosphate.

2. The method of claim 1 in which the mineral acid used in step (a) comprises hydrochloric acid, so that calcium chloride is the salt which is formed.

3. The method of claim 2 in which the hydrolysis of step (b) is carried out by treating the calcium chloride with water at an elevated temperature to form calcium oxide and hydrochloric acid.

4. The method of claim 3 in which the elevated temperature is in the range of about 1000° to about 1200° C.

5. The method of claim 3 in which the reaction between the calcium chloride and water at the elevated temperature is carried out in a cyclone.

6. The method of claim 5 in which the calcium chloride and water solution is damped in and heated to boiling point before it is introduced to the cyclone, care being taken to ensure that the resulting evaporation does not exceed a value commensurate with the solubility of calcium chloride in water in order to ensure that there is sufficient water (slight excess) to take the reaction to completion.

7. The method of claim 1 in which the mineral acid used in step (a) comprises sulphuric acid so that calcium sulphate is the salt which is formed in step (a).

8. The method of claim 7 in which the hydrolysis of step (b) is carried out by treating such calcium sulphate with an alkali metal hydroxide such as sodium hydroxide to form calcium hydroxide and the alkali metal sulphate.

9. The method of claim 1 wherein calcium phosphate rock ore is utilized as source of calcium phosphate.

* * * * *